US011442219B2

United States Patent
Liao et al.

(10) Patent No.: US 11,442,219 B2
(45) Date of Patent: Sep. 13, 2022

(54) FRUSTRUM REFLECTOR PLATE

(71) Applicant: Hewlett-Packard Development Company, L.P., Spring, TX (US)

(72) Inventors: Super Liao, Taipei (TW); Kuan-Ting Wu, Taipei (TW); Cheng-Hua Yu, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/418,991

(22) PCT Filed: Mar. 5, 2019

(86) PCT No.: PCT/US2019/020684
§ 371 (c)(1),
(2) Date: Jun. 28, 2021

(87) PCT Pub. No.: WO2020/180299
PCT Pub. Date: Sep. 10, 2020

(65) Prior Publication Data
US 2022/0100037 A1    Mar. 31, 2022

(51) Int. Cl.
*F21V 8/00* (2006.01)
*G02F 1/13357* (2006.01)
*G02F 1/1335* (2006.01)

(52) U.S. Cl.
CPC ..... *G02B 6/0055* (2013.01); *G02F 1/133615* (2013.01); *G02B 6/0031* (2013.01); *G02F 1/133524* (2013.01); *G02F 1/133553* (2013.01); *G02F 1/133605* (2013.01); *G02F 1/133606* (2013.01)

(58) Field of Classification Search
CPC ........... G02B 6/0031; G02B 6/0055; G02F 1/133524; G02F 1/133553; G02F 1/133605; G02F 1/133606; G02F 1/133615
See application file for complete search history.

(56) References Cited

U.S. PATENT DOCUMENTS

| 7,883,254 | B2 | 2/2011 | Kinoshita et al. |
| 8,049,951 | B2 | 11/2011 | Gruhlke et al. |
| 10,012,783 | B2 | 7/2018 | Boonekamp |
| 10,115,775 | B2 | 10/2018 | Wang |
| 2004/0145915 | A1* | 7/2004 | Kim .............. G02B 6/0061 362/559 |
| 2008/0267572 | A1 | 10/2008 | Sampsell et al. |
| 2010/0033988 | A1 | 2/2010 | Chiu et al. |
| 2011/0255304 | A1 | 10/2011 | Kinoshita |
| 2015/0029754 | A1 | 1/2015 | Ouderkirk et al. |

FOREIGN PATENT DOCUMENTS

| CN | 1196016 A | 10/1998 |
| CN | 107608019 A | 1/2018 |
| WO | WO-2000060278 A1 | 10/2000 |
| WO | WO-2012043361 A * | 4/2012 ........... G02B 6/0038 |
| WO | WO-2016003550 A2 | 1/2016 |

* cited by examiner

*Primary Examiner* — Keith G. Delahoussaye
(74) *Attorney, Agent, or Firm* — Fabian VanCott

(57) ABSTRACT

A lighting system may include a light guide to receive light from a light source; and a reflector plate including a frustrum structure formed on the surface of the reflector plate to receive refracted light from the light guide.

20 Claims, 5 Drawing Sheets

FRUSTRUM REFLECTOR PLATE

BACKGROUND

Display devices implement a number of technologies in order to present images and text to a user. One of these technologies includes backlighting systems. The backlighting systems may be used in display devices that use liquid crystal technologies such as liquid crystal displays (LCDs). Backlighting provides illumination to the LCDs that the liquid crystal cannot provide for itself.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
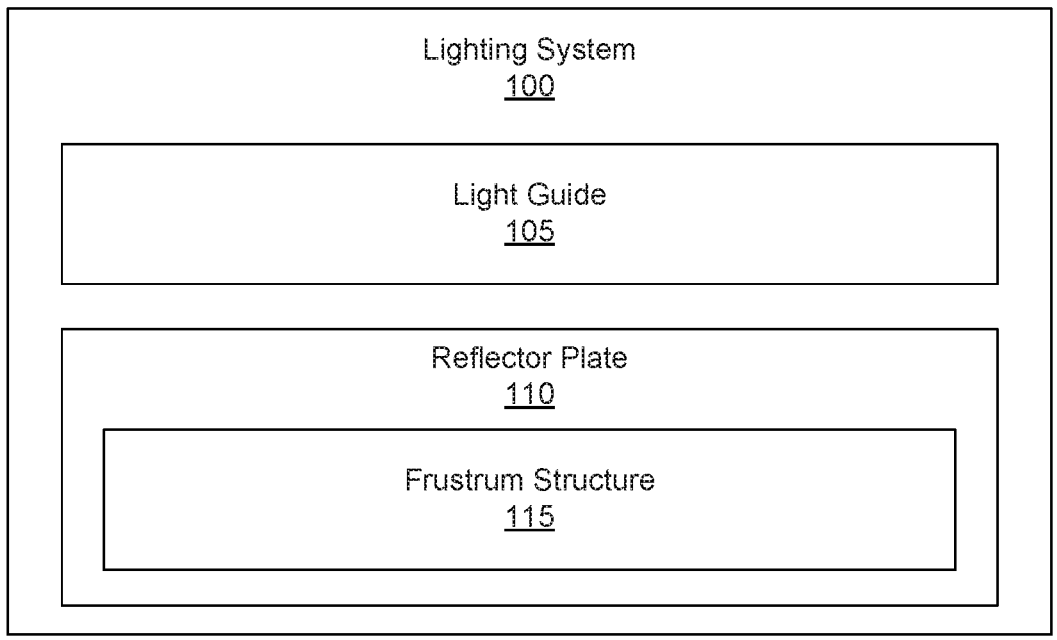
FIG. 1 is a diagram of a block diagram of a light system according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Backlighting systems provide light to a display device that otherwise cannot produce its own light such as, for example, light-emitting diodes (LEDs). Backlighting systems may be found in, for example, liquid crystal displays (LCDs). The light provided by the backlighting system allows for the light to be passed though the liquid crystal of the LCD in order to produce a visible picture at a viewing angle of the LCD.

Optimal light emissions from the backlighting systems may produce better quality images to the viewer of the display device. Some backlighting systems includes a light guide that directly receives light from a single light source and directs that light source towards the liquid crystal components of the display device. However, light may leak from this light guide preventing the light from reaching the liquid crystal components of the display device. As a result, optimal illumination of the liquid crystal components of the display device is not achieved. This causes a relatively degraded image to appear on the display than otherwise would have been achieved had all of the light been used to illuminate the liquid crystal components of the display device.

To achieve a relatively higher degree of illumination of the liquid crystal components of the display device, the display device may include a light reflective device. This light reflective device may be placed behind the light guide so that any light leaked from the light guide may be reflected back into the light guide thereby increasing the amount of light that is reflected by the light guide to the liquid crystal components of the display device. In some instances, the reflective device may be a white sheet or a silver sheet that may "recycle" the light back into the light guide. These white or silver sheets, however, may be scratched by the light guide plate during manufacture or use by a user resulting in poor or optically-noticeable defects in image quality.

The present specification describes a lighting system that includes a light guide to receive light from a light source; and a reflector plate, including a frustrum structure formed on the surface of the reflector plate to receive refracted light from the light guide.

The present specification also describes a backlight reflector that includes a plurality of prism structures aligned along a common plane, the prism structures comprising four trapezoidal surfaces; and a planar layer coupled to each of the prism structures; wherein each of the plurality of prism structures receive refracted light from a light guide and return the light incident to the light guide.

The present specification further describes a method of forming a backlight reflector for a lighting system that includes with a three-dimensional printing device: forming a frustrum prism onto a planar surface; and placing the frustrum prism behind a light guide.

As used in the present specification and in the appended claims, the term "frustrum" is meant to be understood as a solid or three-dimensional object that lies between one or two parallel planes cutting it. In an example, the frustrum is a solid in the form of a four-sided pyramid with a top portion cut off. The plane at which the top portion is cut may be parallel with a plane of a base of the frustrum. In an example, this frustrum may be a right frustrum. In any of these examples, the sides of the frustrum may be trapezoids.

Turning now to the figures, FIG. 1 is a diagram of a block diagram of a light system (100) according to an example of the principles described herein. The light system (100) may be included within any display device. In a specific example, the light system (100) and, more specifically, the reflector plate (110) of the light system (100), may be provided in a liquid-crystal display (LCD) device. The light system (100) may provide an amount of light to any liquid-crystal elements of the display device the light system (100) forms a part of the display system.

In an example, the light system (100) may includes a light guide (105). A light guide (105) may be any device that receives light from a light source and directs that light towards other layers within the display device such as a liquid crystal layer. In an example, the light guide (105) may have certain light refractive properties that receive light from any light source and redirects that light to the liquid crystal layer. In an example, the light may be directed towards the liquid crystal layer through the use of a number of microstructures that purposefully destroy the total internal reflection of light within the light guide (105) and direct light out of the light guide and towards the liquid crystal layer. The light source providing light to the light guide (105) may be placed anywhere in the light system (100). In an example, the light source providing the light to the light guide (105) may be at an edge of the light guide (105) so that light may be directed into the light guide (105) without increasing the thickness of the light system (100) and display device. This may be referred to as an edge lighting system.

However, because the light guide (105) does not completely direct all light towards the liquid crystal layer, some light may "leak" out of the light guide (105) and not be redirected towards the liquid crystal layer. This may be due to the microstructures formed on the light guide (105) or even defects in the light guide (105) itself. This light leakage is directly related to the light guide (105) deliberately not achieving total internal reflection for all light entering the light guide (105). Thus, light may also "leak" from out a surface of the light guide (105) opposite the liquid crystal layer thereby reducing the available light provided to the liquid crystal layer.

Consequently, the light system (100) may include a reflector plate (110) to reflect the light from the light guide (105) back to the light guide (105) and towards the liquid crystal layer. The reflector plate (110) is placed on the side of the light guide (105) opposite the liquid crystal layer. The reflector plate (110) receives all light from the light guide (105) and returns that light back to the light guide (105).

The reflector plate (110) may comprise a number of frustrum structures (115). The reflector plate (110) itself may generally be formed by two parts: the number of frustrum structures (115) formed onto a surface. The surface may include a light guide itself and may be formed with the frustrum structures (115) so that light leakage from the frustrum structures (115) pass through the surface and directed back into the frustrum structures (115) and back towards the light guide (105) from which the light was received by the reflector plate (110) initially.

The frustrum structures (115) and/or surface may be made of any material that can transmit light therethrough. In an example, the frustrum structures (115) have a different index of refraction relative to those materials, including air, touching the frustrum structures (115) and/or reflector plate (110). The difference in index of refraction causes the light, when entering the frustrum structures (115) and/or surface onto which the frustrum structures (115) are formed, causes internal reflection of the light through the reflector plate (110) and out towards the light guide (105). The shape of the frustrum structures (115) may cause the internal reflection of the light. Specifically, the angles of the sides of the frustrum structures (115) may be manipulated so that internal reflection within the frustrum structures (115) cause light to exit the frustrum structures (115) normal to a base surface of the frustrum structures (115).

Figure 2A:
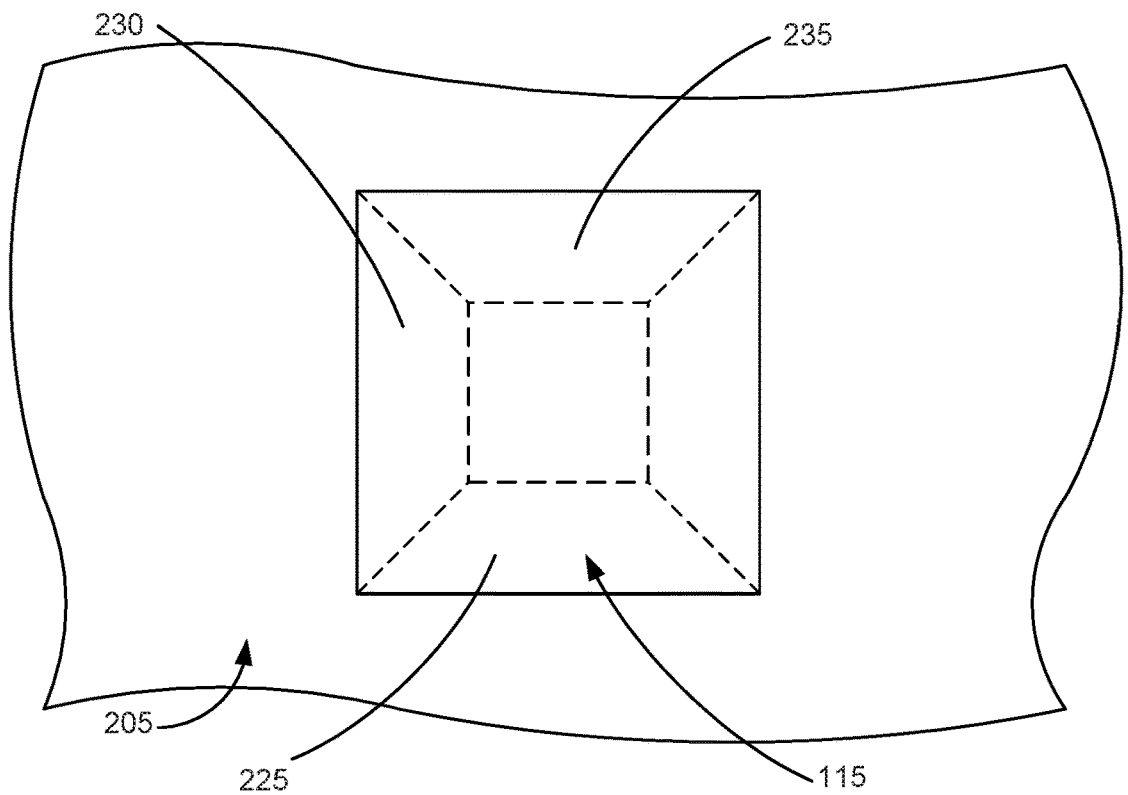
FIG. 2A is a top view of a frustrum structure of FIG. 1 according to an example of the principles described herein.
Figure 2B:
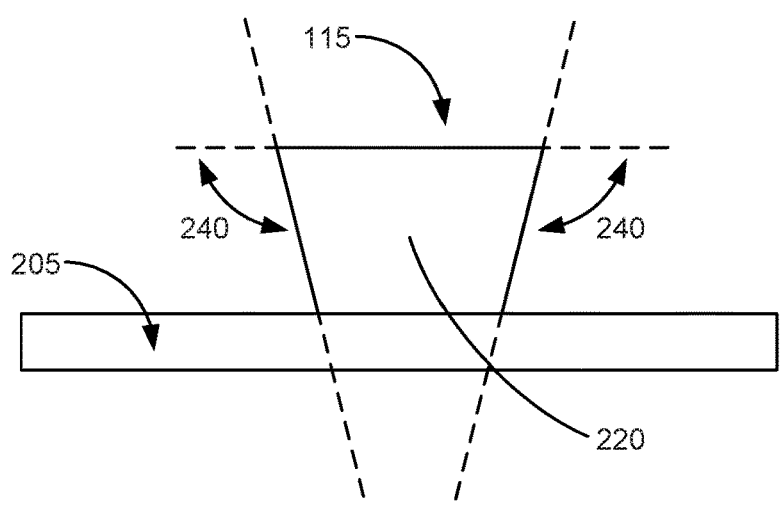
FIG. 2B is a side view of a frustrum structure of FIG. 1 according to an example of the principles described herein.

FIG. 2A is a top view of a frustrum structures (115) of FIG. 1 according to an example of the principles described herein. FIG. 2b is a side view of a frustrum structure (115) of FIG. 1 according to an example of the principles described herein. In this example, the frustrum structure (115) may have a first base (210) and a second base (215) with the second base (215) being coupled or integrated into the surface (205). The plane defining the first base (210) may have a larger surface area than the plane defining the second base (215) thereby forming the frustrum structure (115) described herein. Because of the difference in surface area defined by the first base (210) relative to the second base (215), the trapezoidal sides (220, 225, 230, 235) of the frustrum structure (115) are angled relative to the first base (210) and second base (215). The angle (240) of the trapezoidal sides (220, 225, 230, 235) may define how the frustrum structures (115) within an array of frustrum structures (115) receive and reflect light back to the light guide (105). In an example, the angle (240) may be 30 to 50 degrees. In an example, the angle (240) may be 40 degrees.

As described herein, the reflector plate (110) may include a plurality of frustrum structures (115) arranged on a single plane and coupled to or integrated into the surface (205). Thus, the surface (205) may include frustrum structures (115) that are closest to the edge of the surface (205) and others that are located within the center area of the surface (205). In an example, the angle (240) of each of the frustrum structures (115) may be different based on their location across the surface (205). In an example, the frustrum structures (115) closer to the edge of the surface (205) may have an angle (240) relatively steeper than the angle (240) of the frustrum structures (115) placed closer to the center of the surface (205). In an example, the frustrum structures (115) closer to the edge of the surface (205) may have an angle (240) relatively shallower than the angle (240) of the frustrum structures (115) placed closer to the center of the surface (205).

In some examples, the distance between the frustrum structures (115), called herein the "pitch," may change based on the placement of the individual frustrum structures (115) on the surface (205). In an example, the pitch may be between 50 and 150 micrometer (μm). In an example, the pitch may be 100 micrometer (μm).

In an example, the pitch of the frustrum structures (115) may be shorter the closer to the center of the surface (205) than the frustrum structures (115) placed on the edge of the surface (205). Thus, the pitch of the frustrum structures (115) along the surface (205) may vary in this manner. In an example, the pitch amongst the frustrum structures (115) may be gradient from the center of the surface (205) to the edge of the surface (205). In an example, the pitch of the frustrum structures (115) may be longer the closer to the center of the surface (205) than the frustrum structures (115) placed on the edge of the surface (205). Thus, the pitch of the frustrum structures (115) along the surface (205) may vary in this manner. In an example, the pitch amongst the frustrum structures (115) may be gradient from the edge of the surface (205) to the center of the surface (205).

Figure 3:
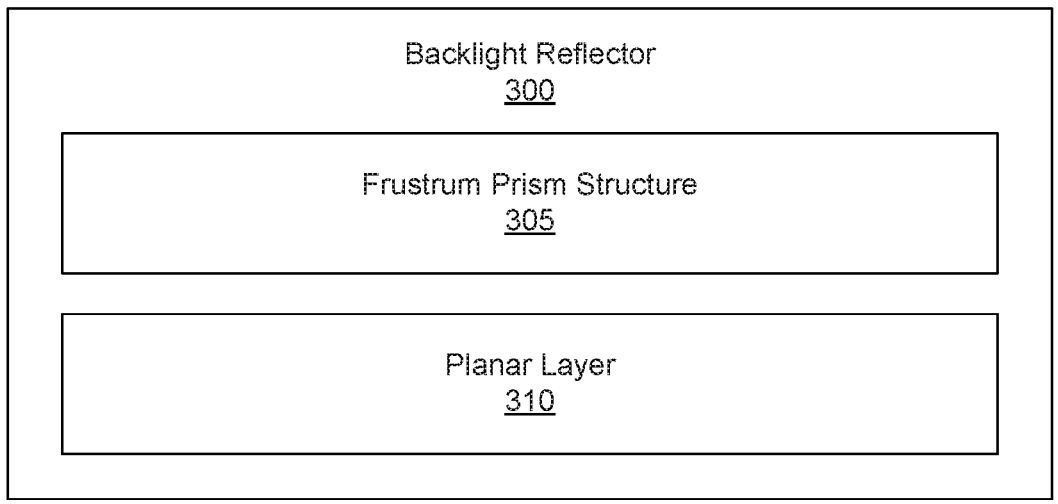
FIG. 3 is a block diagram of a backlight reflector according to an example of the principles described herein.

FIG. 3 is a block diagram of a backlight reflector (300) according to an example of the principles described herein. The backlight reflector (300) may include a number of frustrum prism structures (305) and a planar layer (310). The backlight reflector (300) may be used to reflect light within a display device such as a liquid-crystal display device. In an example, the backlight reflector (300) may reflect light back at a light guide so that the light guide may redirect that light through a liquid-crystal layer.

The frustrum prism structures (305) may be formed onto the planar layer (310) or may be integrated into the planar layer (310). Each of the frustrum prism structures (305) and planar layer (310) may be made of an optically transparent material such as polycarbonate (PC), poly(methyl methacrylate) (PMMA); or an acrylic, among others. The frustrum prism structures (305) and planar layer (310) may be formed using any method such as extrusion, acid etching, three-dimensional (3D) printing, or combinations thereof. In an example, the frustrum prism structures (305) and planar layer (310) may be formed into a single piece using a 3D printing device. In this example, the index of refraction may be maintained throughout the frustrum prism structures (305) and planar layer (310). With the formation of the frustrum prism structures (305) and planar layer (310) into an integrated single piece, light may be received from a light guide and reflected throughout the entirety of the reflector plate and back into the light guide.

The shape of the frustrum prism structures (305) may be any shape that can receive light and reflect that light in a direction normal to the planar layer (310) and array of frustrum prism structures (305) formed thereon. As described herein, the frustrum prism structures (305) may be in the form of the frustrum structures (115) described in connection with FIGS. 1 and 2a-2b.

During manufacturing of a display device, the backlight reflector (300) may be affixed to a chassis of a display device. By doing to, the body of the display device may be used to align the backlight reflector (300) with other layers of the display device. In an example, the backlight reflector (300) with its frustrum prism structures (305) and planar layer (310) may be formed on the chassis directly by a 3D printing device and its processes.

Additionally, the frustrum prism structures (305) may be arranged along a common plane on the planar layer (310). As described herein the pitch of the array of frustrum prism structures (305) may vary depending on the location of the frustrum prism structure (305) on the planar layer (310). Additionally, the angle of the frustrum prism structures (305), when formed into the frustrum structures (115) of FIG. 1, may have varying angles relative to their bases as described herein.

Figure 4:
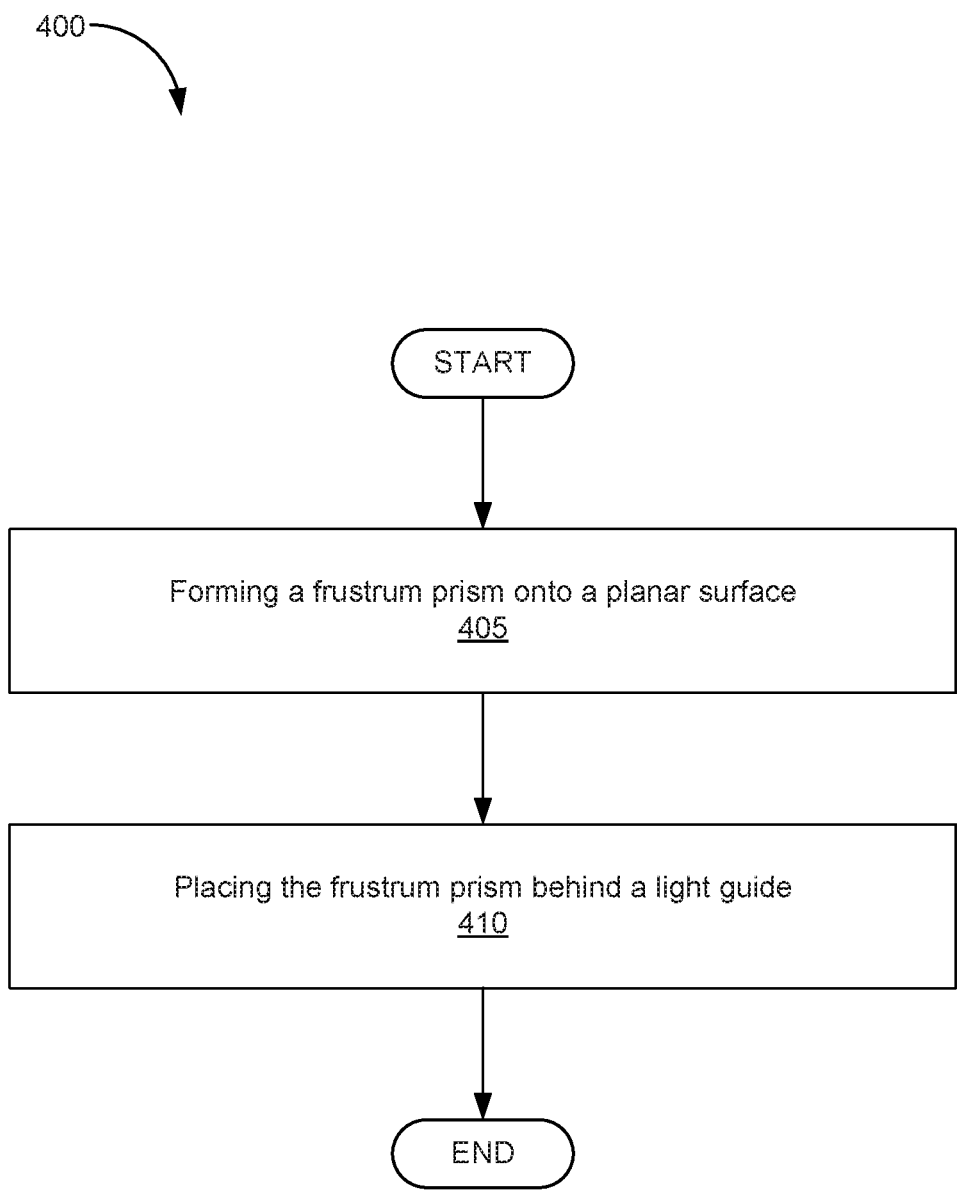
FIG. 4 is a flowchart depicting a method of forming a backlight reflector for a lighting system according to an example of the principles described herein.

FIG. 4 is a flowchart depicting a method (400) of forming a backlight reflector for a lighting system according to an example of the principles described herein. The method (400) may begin with forming (405) a frustrum prism onto a planar surface. Examples provided herein include apparatuses, processes, and methods for generating three-dimensional objects such as the frustrum and/or the planar surface. Apparatuses for generating three-dimensional objects may be referred to as additive manufacturing apparatuses. Example apparatuses described herein may correspond to three-dimensional printing systems, which may also be referred to as three-dimensional printing devices. In an example additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied. Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where powder-based build material may comprise wet and/or dry powder-based materials, particulate materials, and/or granular materials. In some examples, the build material may be a weak light absorbing polymer. In some examples, the build material may be a thermoplastic. In some examples, the build material may be powdered forms of PC, PMMA, and/or an acrylic. Furthermore, as described herein, agent may comprise fluids that may facilitate fusing of build material when energy is applied. In some examples, agent may be referred to as coalescing or fusing agent. In some examples, agent may be a light absorbing liquid, an infrared or near infrared absorbing liquid, such as a pigment colorant. In some examples at least two types of agent may be selectively distributed on a build layer. In some examples at least one agent may inhibit fusing of build material when energy is applied.

Example apparatuses may comprise an agent distributor. In some examples, an agent distributor may comprise at least one fluid ejection device. A fluid ejection device may comprise at least one printhead (e.g., a thermal ejection based printhead, a piezoelectric ejection based printhead, etc.). An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may comprise other types of fluid ejection devices that selectively eject small volumes of fluid.

In some examples, an agent distributor may comprise at least one fluid ejection device that comprises a plurality of fluid ejection dies arranged generally end-to-end along a width of the agent distributor. In some examples, the at least one fluid ejection device may comprise a plurality of printheads arranged generally end-to-end along a width of the agent distributor. In such examples, a width of the agent distributor may correspond to a dimension of a build area. For example, a width of the agent distributor may correspond to a width of a build area. As will be appreciated, an agent distributor may selectively distribute agent on a build layer in the build area concurrent with movement of the scanning carriage over the build area. In some example apparatuses, the agent distributor may comprise nozzles including nozzle orifices through which agent may be selectively ejected. In such examples, the agent distributor may comprise a nozzle surface in which a plurality of nozzle orifices may be formed.

In some examples, apparatuses may comprise a build material distributor to distribute build material in the build area. A build material distributor may comprise, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

In an example, the frustrum and planar formation building process may include, with a 3D printing device, selectively ejecting a material onto a substrate in order to form one or both of the frustrum prime and planar surface. In this example, the ejected material may be viscous forms of one or a plurality of PC, PMMA, and/or an acrylic that is to be ejected onto the substrate. In an example, the substrate may be a specified surface such as a chassis of a display device or lighting system.

In an example, the powder or liquid materials used to form the frustrum prism structures may include a colorant. In this example, individual frustrum prism structures may be printed using any 3D printing process descried herein along with a colorant. Individual colored frustrum prism structures may be distributed throughout the planer surface. In an example, alternating patterns of colored frustrum prism structures may be formed. Such examples of alternating patterns of colored frustrum prism structures may include alternating frustrum prism structures of white and silver. Other colors exist such as blue, red, and yellow.

The method (400) may include placing (410) the frustrum prism behind a light guide. The light guide may be any device that receives light from a light source and direct that light towards a liquid-crystal layer within, for example, a display device the lighting system is placed within. However, because some light may "leak" out of the light guide, the frustrum prism and planar surface reflect light back to the light guide. This is done to increase the amount of light supplied to the liquid crystal layer within the display device.

Figure 5:
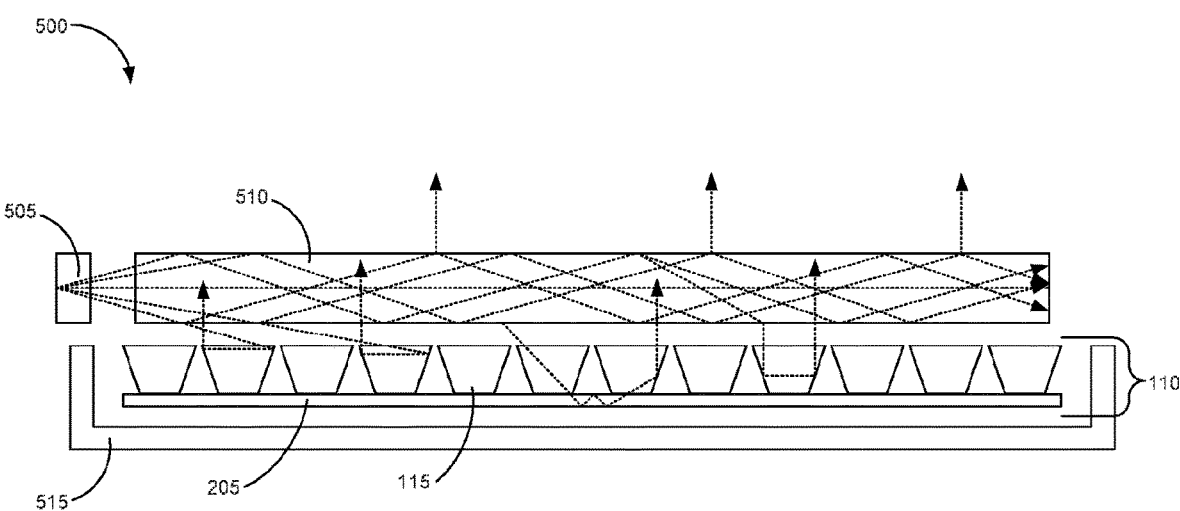
FIG. 5 is a cut-out side view of a lighting system according to an example of the principles described herein.

FIG. 5 is a cut-out side view of a lighting system (500) according to an example of the principles described herein. The lighting system (500) may include a light source (505), a light guide (510), a chassis (515), and a reflector plate (110) that includes a plurality of frustrum structures (115) and a surface (205).

As described herein, the frustrum structures (115) are arranged along a common plane on the surface (205). The number, size, pitch, and angle characteristics of the frustrum structures (115) may be varied as described herein. As the light is emitted from the light source (505) is travels through the light guide (510) per the light rays depicted in FIG. 5 as dashed lines. The light may travel through the light guide (510) and may exit a surface of the light guide (510) opposite the reflector plate (110). However, light may also "leak" out the opposite surface of the light guide (510) and towards the reflector plate (110). The frustrum structures (115) of the reflector plate (110) may then receive this light and, due to the angles (240) of the sides of the frustrum structures (115), redirect the light back to the light guide (510) and eventually out the surface of the light guide (510) opposite the reflector plate (110). Additional light may pass through the frustrum structures (115) and into the surface (205). In an example, the surface (205) may, itself, act as a light guide to return the light back to the frustrum structures (115) and, eventually, the frustrum structures (115) as described herein. In this manner, light incident to the frustrum structures (115) and/or surface (205) may have a change path due to the principles of total reflection with these structures. This provides for relatively more light being reflected back to the light guide (510) than otherwise would have been reflected without the reflector plate (110).

Additionally, because of the materials used and the form of the frustrum structures (115), there is relatively less chances of damage to the reflector plate (110) than would otherwise been seen in white or silver layers reflector plates. Additionally, the materials used to form the frustrum structures (115) may be relatively cheaper than a layer of silver thereby reducing the costs of manufacture while also increasing the visible characteristics of the display device the reflector plate (110) is used within.

The method (400) described herein may implement any 3D printing device in order to form the reflector plate (110) with its frustrum structures (115) and/or surface (205). In this example, a substrate may be provided for the 3D printing device to deposit PC, PMMA, an acrylic, and/or other type of depositable optically-clear material onto the substrate. In order to accomplish this, the 3D printing device may receive computer readable program code defining layers of the reflector plate (110). As the 3D printing device receives this computer-readable program code, it may deposit the material down onto the substrate layer by layer. In an example, the 3D printing device may include a data storage device and processing device used to store and execute the computer-readable program code, respectively. Additionally, or alternatively, the 3D printing device may be coupled to a computing device that provides the computer-readable program code to the 3D printing device. The computing device may be communicatively coupled to the 3D printing device either by a wired or wireless connection.

The specification and figures describe a light system (100), a backlight reflector (300), and a method of forming a backlight reflector (300). The method of forming the backlight reflector may be utilized using any type of 3D printing device resulting in a relatively expedited manufacturing process as compared to other types of manufacturing processes. Additionally, the arrangement of the reflector plate (110) with its frustrum structures (115) and surface (205) may provide relatively more light to be reflected back to a light guide (510) within the lighting system (500) than would a white or silver layered reflector could achieve. Additionally, the reflector plate (110) described herein is less susceptible to damage during assembly of the lighting system (500) than could be seen in the assembly of a lighting system that had a silver or white reflector plate. As a result, the cost of manufacture is reduced and the quality of image in the display device is increased using the reflector plate (110) described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A lighting system, comprising:
a light guide to receive light from a light source; and
a reflector plate, comprising:
a frustrum structure formed on the surface of the reflector plate to receive refracted light from the light guide, the frustrum structure comprising:
a first base, and
a second base parallel to the first base, wherein the first base has a larger surface area than the second base and the second base is coupled to the surface of the reflector plate.

2. The lighting system of claim 1, wherein a plurality of frustrum structures are formed on the surface of the reflector plate to receive the refracted light along an entirely of a surface of the light guide facing the reflector plate.

3. The lighting system of claim 1, wherein the frustrum structure and reflector plate are integrated into a single piece to receive refracted light throughout the entirety of the reflector plate.

4. The lighting system of claim 1, wherein the frustrum structure is of the form of a right frustrum.

5. The lighting system of claim 1, wherein the reflector plate comprises:
a first layer of frustrum structures; and
a second planar layer affixed to each of the plurality of frustrum structures to align the plurality of frustrum structures along a common plane.

6. The lighting system of claim 5, wherein the second planar layer is a chassis of the lighting system.

7. The backlight reflector of claim 6, wherein the plurality of frustrum prism structures comprises differently colored frustrum prism structures.

8. A backlight reflector, comprising:
a plurality of frustrum prism structures aligned along a common plane, the prism structures comprising a plurality of trapezoidal surfaces, a first base, and a second base parallel to the first base, wherein the first base has a larger surface area than the second base; and
a planar layer coupled to each of the prism structures;
wherein:
each of the plurality of prism structures receive refracted light from a light guide and return the light incident to the light guide;
the second base of each of the plurality of prism structures are coupled to a surface of the planar layer; and
the first base is adjacent the light guide.

9. The backlight reflector of claim 8, wherein a pitch of the prism structures is between 50 and 150 micrometers.

10. The backlight reflector of claim 8, wherein the planar layer is a portion of a chassis used to hold the backlight reflector.

11. The backlight reflector of claim 8, wherein each of the plurality of prism structures are in the form of a right frustrum and wherein angle of the side of the right frustrum are between 30 and 50 degrees relative to a base of the frustrum structures.

12. The backlight reflector of claim 8, wherein a base of the prism structure faces the light guide.

13. The backlight reflector of claim 8, wherein an angle of frustrum prism structures at an edge of the planar layer is different than an angle of frustrum prism structures at a center of the planar layer.

14. The backlight reflector of claim 8, wherein a pitch between a first pair of adjacent frustrum prism structures is different than a second pair of adjacent frustrum prism structures based on a different placement of the first and second pair across the planar layer.

15. The backlight reflector of claim 8, further comprising a gradient pitch among the plurality of frustrum prism structures across the planar layer.

16. A method of forming a backlight reflector for a lighting system, comprising:
with a three-dimensional printing device:
forming a frustrum prism onto a planar surface, the frustrum prism comprising a first base and a second base which second base is parallel to the first base, wherein:
the first base has a larger surface area than the second base; and
the second base is coupled to the surface of the planar surface; and
placing the frustrum prism behind a light guide, wherein the first base is adjacent the light guide.

17. The method of claim 16, wherein the planar surface is a chassis of the light system.

18. The method of claim 16, wherein the planar surface is of a planar light guide.

19. The method of claim 16, where the angle of the sides of the prism next to and relative to the base is between 30 and 50 degrees.

20. The method of claim 16, further comprising, with the three-dimensional printing device, three-dimensional printing the frustrum prism on a chassis used to hold the backlight reflector.

* * * * *